(12) United States Patent
Krauss et al.

(10) Patent No.: US 8,807,326 B2
(45) Date of Patent: Aug. 19, 2014

(54) LOG SINGULATOR AND METHOD OF SINGULATING LOGS

(75) Inventors: Josh Krauss, Spanish Fort, AL (US); Jim Krauss, Hot Springs, AR (US)

(73) Assignee: Price Logpro, LLC, Malvern, AR (US)

( * ) Notice: Subject to any disclaimer, the term of this patent is extended or adjusted under 35 U.S.C. 154(b) by 238 days.

(21) Appl. No.: 13/588,179

(22) Filed: Aug. 17, 2012

(65) Prior Publication Data

US 2013/0048468 A1   Feb. 28, 2013

Related U.S. Application Data

(60) Provisional application No. 61/527,304, filed on Aug. 25, 2011.

(51) Int. Cl.
*B65G 29/00* (2006.01)
*B65G 47/14* (2006.01)
*B27B 31/00* (2006.01)

(52) U.S. Cl.
CPC .... *B65G 47/1478* (2013.01); *B65G 2201/0282* (2013.01); *B27B 31/00* (2013.01)
USPC .................... 198/478.1; 198/463.6

(58) Field of Classification Search
None
See application file for complete search history.

(56) References Cited

U.S. PATENT DOCUMENTS

| | | | | |
|---|---|---|---|---|
| 3,400,837 A | * | 9/1968 | Dalik | ............................... 414/17 |
| 4,930,616 A | | 6/1990 | Lindberg | |
| 5,011,024 A | | 4/1991 | Bunney | |
| 5,119,930 A | | 6/1992 | Stelter | |
| 5,174,351 A | | 12/1992 | Lindenblatt | |
| 5,257,688 A | | 11/1993 | Fridlund | |
| 5,257,898 A | * | 11/1993 | Blume | ...................... 414/745.9 |
| 5,423,417 A | | 6/1995 | Redekop | |
| 5,518,106 A | * | 5/1996 | Allard | ........................ 198/459.5 |
| 5,813,512 A | | 9/1998 | Anderson | |
| 6,779,649 B2 | | 8/2004 | Woodham | |
| 6,971,423 B2 | | 12/2005 | Starr | |
| 7,004,303 B2 | | 2/2006 | Rennie | |
| 7,152,728 B2 | | 12/2006 | Woodham | |
| 7,448,532 B2 | | 11/2008 | Woodham | |
| 2002/0158078 A1 | | 10/2002 | Goater | |
| 2008/0017276 A1 | | 1/2008 | Woodham | |

OTHER PUBLICATIONS

Weyerhauser Company, "The Clockwork Feeder.".
PSI Sales, Clockwork Feeder (2004), Figs. 1A-1C in present application.
Weyco Clockwork Feeder, (2005), Fig. 2 in present application.
High Lift clockwork style singulator for Wood Lumber in Idabel, OK, (2008), shown in Fig. 3 of the present application.
Clockwork Feeder for Dixon Lumber in Eufaula, AL (2009-2010), shown in Fig. 4 of the present application.

* cited by examiner

*Primary Examiner* — Kavel Singh
(74) *Attorney, Agent, or Firm* — Jeffrey S. Melcher; Manelli Selter PLLC

(57) ABSTRACT

A singulator and method that separates a single log from a pile of logs and supplies the single log to a conveyor.

16 Claims, 16 Drawing Sheets

LOG SINGULATOR AND METHOD OF SINGULATING LOGS

This application claims priority to U.S. Provisional Patent Application Ser. No. 61/527,304, filed 25 Aug. 2011, the complete disclosure of which is incorporated herein by reference.

FIELD OF THE INVENTION

The invention relates to a log singulator and a method that separates a single log from a pile of logs and supplies the single log to a conveyor.

BACKGROUND OF THE INVENTION

Logs (also referred to as lumber) received at a typical wood processing facility, such as a sawmill, vary both in diameter and length. The logs may be tapered differently from one another and come in a variety of physical shapes, all of which are different from the ideal log shape, which is straight, has a perfectly circular cross-sectional area and a constant diameter throughout its length. The logs are typically deep piled on an in-feed log deck, such that the logs become skewed, crossed and/or tangled. It is generally necessary to feed the logs to the processing facility one log at a time. It is also desirable that there be no interruption in the flow of logs into the wood processing facility.

A log singulator is used to separate logs from a pile of logs on an in-feed deck and feed them one at a time to an out-feed conveyor. Published U.S. Patent Appl'n Ser. No. 2002/0158078 discloses an example of a prior art log singulator, the entire contents of which is incorporated herein by reference. The singulators come in many different types.

"Step sorter" singulators, such as the devices shown by U.S. Pat. No. 5,423,417 ("Log Ladder"), U.S. Pat. No. 5,257,688 ("Step Feeder") and U.S. Pat. No. 5,174,351 (additions to "Step Feeder"), sort logs in a series of steps which are distributed horizontally along a small vertical incline. The main disadvantages of such singulators are imprecise separation of logs (i.e. tendency to carry more than one log at a time toward the wood processing facility) and high floor area occupied within the processing facility. Another common disadvantage of some of these singulators is the absence of surge and catch-up features. Such features are usually used to ensure that logs are fed at an optimal rate to a wood processing facility.

"Rotary sorter" singulators, such as the device described in U.S. Pat. No. 5,011,024 ("Rotary Log Sorter"), have drums with pockets or arms that rotate continuously. The pockets or arms carry logs one at a time to an out-feed conveyor. A main problem with such singulators is that occasionally more than one log will be taken in by the pockets or arms. Such singulators are also poor at efficiently raising logs vertically, as they occupy more floor space than desired when doing so. Another problem associated with such singulators is the inability to singulate oddly-shaped logs. A further common disadvantage of such singulators is the absence of surge and catch-up features to ensure that logs are fed at an optimal rate to a wood processing facility.

"Oscillating quadrant/arc" singulators, such as the device described in U.S. Pat. No. 5,119,930 ("Quadrant Log Feeder"), elevate logs along a curved surface. The main disadvantages of such singulators are imprecise separation of logs and low singulation speed (i.e. the number of logs per minute that can be separated from an in-feed log deck and fed, one at a time, to an out-feed conveyor). Also, such singulators do not provide for optimal surge and catch-up features to ensure that logs are fed, one at a time and at an optimal rate, to an out-feed conveyor.

Weyerhaeuser Company designed and built the first clockwork style reciprocating log singulator and named it "The Clockwork Feeder." Weyerhaeuser built a few of the Clockwork feeders, which was suitable for short wood of 8 to 20 feet in length, for a few Weyerhaeuser (Weyco) lumber mills on the west coast. To our knowledge, no patent was obtained.

In 2004, PSI Sales designed and built their version of the Clockwork Feeder for Weyco Dierks, which is shown in FIGS. 1A-1C. Due to the shallow design of the Weyco Clockwork feeder, the Dierk's machine required an additional rotary style pre-feeder to help breakdown the deep pile of incoming logs. One major disadvantage with the Clockwork feeder(s) is it's a shallow machine that actually loses elevation from the in-feed deck to the out-feed conveyor. Due to this design limitation the clockwork feeder can only be fed with a single layer of logs coming to it or it has to be supplemented with an additional pre-breakdown machine device. One of the Clockworks assets is, due to its balanced design, the feeder can be cycled at high rates and requires low horsepower requirements.

In 2005, a modified version of the Weyco Clockwork Feeder was made, as shown in FIG. 2. One of the key advantages of this design feeder was the ability to gain elevation from the in-feed deck to the Outfeed conveyor, which helps to handle a deep pile of incoming logs. However, the largest problem with the feeder is, due to its unbalanced design, it has a slower cycle time and requires much more horsepower to run.

In 2008, we built a "high-lift" clockwork style singulator for Wood Lumber in Idabel, Okla., as shown in FIG. 3.

In 2009-2010, we built a singulator for Dixon Lumber in Eufaula, Ala., which is based off of the original clockwork feeder. See FIG. 4.

There is a need to improve the input log capability and efficiency of the prior art singulators.

SUMMARY OF THE INVENTION

An objective of the invention is to provide a singulator having improved input capability and efficiency.

The above objectives and other objectives are obtained by a log singulator comprising:
a base;
first, second and third barriers supported by the base, the first barrier and the second barrier form a peak, the third barrier and the second barrier form a valley, the first barrier having a height at least twice the thickness of logs being fed to the singulator from an in-feed, the first, second and third barriers having a length of at least the length of logs being fed to the singulator during use;
a plurality of lifting devices having first, second and third arms extending in a radial direction from a central axis, the lifting devices being mounted on a shaft, the lifting devices being spaced apart along the length of the three barriers and disposed within the barriers, the first and second barriers having openings constructed and arranged to allow the arms to extend therethrough, and the lifting devices being rotatable between a starting position and a finishing position;
the first arm being constructed and arranged so that in the starting position the first arm is retracted within the first barrier and a log can move into a starting position against a bottom of the first barrier, and when the lifting device is rotated from the starting position to the finishing position the first arm extends from the first barrier and the log is lifted by a top surface of the first arm up the first barrier and then over the peak so the log then travels down a first portion of the second barrier, and a side surface of the first arm extending from the first barrier blocks other logs from contacting the first barrier;

the second arm being constructed and arranged such that in the finishing position the second arm extends from the second barrier and the log pushed over the peak by the first arm is held in a position of the first portion of the second barrier by a top surface of the second arm and in the starting position the second arm is retracted into the second barrier allowing the log to travel down a second portion of the second barrier;

the third arm being constructed and arranged so that in the starting position the third arm extends from the second barrier and the log traveling from the first portion of the second barrier is held in the position of a second portion of the second barrier by a top surface of the third arm and when the lifting device rotates from the starting position to the finishing position the third arm retracts into the second barrier and the log held in the position of the second portion is allowed to drop into the valley, and when the third arm moves from the finishing position to the starting position the log in the valley is moved by a back side of the third arm from the valley up and over the third barrier; and a drive system connected to the shaft constructed and arranged to rotate the shaft and lifting devices between the starting and finishing positions.

The above objectives and other objectives are also met by a method of using a singulator to supply single logs to a conveyor from an in-feed pile of logs, the singulator comprising:

a base;

first, second and third barriers supported by the base, the first barrier and the second barrier form a peak, the third barrier and the second barrier form a valley, the first barrier having a height at least twice the thickness of logs being fed to the singulator from an in-feed, the first, second and third barriers having a length of at least the length of logs being fed to the singulator; and a plurality of lifting devices having first, second and third arms extending in a radial direction from a central axis, the lifting devices being mounted on a shaft, the lifting devices being spaced apart along the length of the three barriers and disposed within the barriers, the first and second barriers having openings constructed and arranged to allow the arms to extend therethrough, and the lifting devices being rotatable between a starting position and a finishing position, the method comprising:

supplying logs to an in-feed of the singulator so that at least one first log contacts the first barrier;

using the drive system to rotate the lifting devices from a starting position to a finishing position during which the first log is lifted by the top surface of the first arm over the peak to contact a top surface of the second arm and the second barrier, and additional logs are held away from the first barrier by the side surface;

using the drive system to rotate the lifting devices back to the starting position during which the second arm retracts back into the second barrier and the first log falls down the second barrier to contact a top surface of the third arm and the first arm retracts back into the first barrier so that at least one second log can contact the first barrier;

using the drive system to rotate the lifting devices back to the finishing position during which the second log is lifted by the top surface of the first arm over the peak to contact a top surface of the second arm and the second barrier, and the third arm retracts back into the second barrier and the first log falls into the valley; and using the drive system to rotate the lifting devices back to the starting position during which the first log in the valley is lifted by a back side of the third arm up over the third barrier and onto the conveyor, the second arm retracts into the second barrier to allow the second log to drop onto the top surface of the third arm, and the first arm retracts into the first barrier so that at least one third log contacts the first barrier.

DETAILED DESCRIPTION OF PREFERRED EMBODIMENTS

Figure 1A:
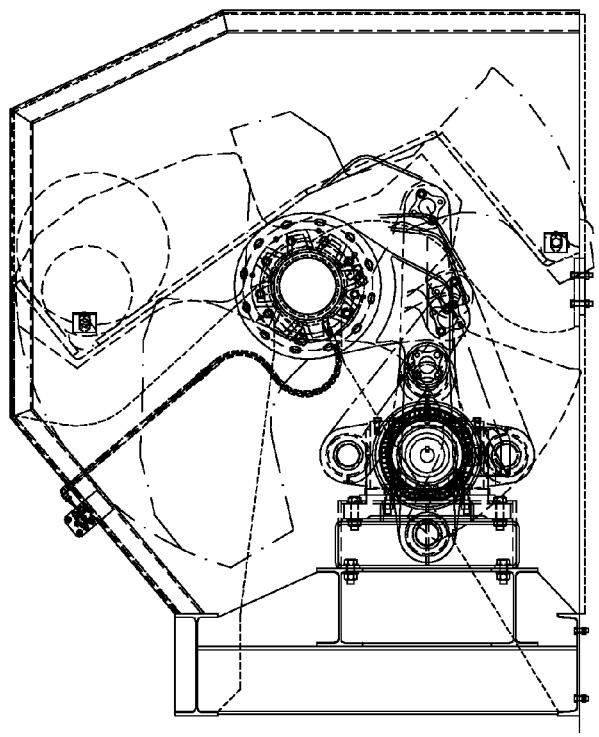
FIGS. 1A-1C illustrate a prior art clockwork singulator.
Figure 1B:
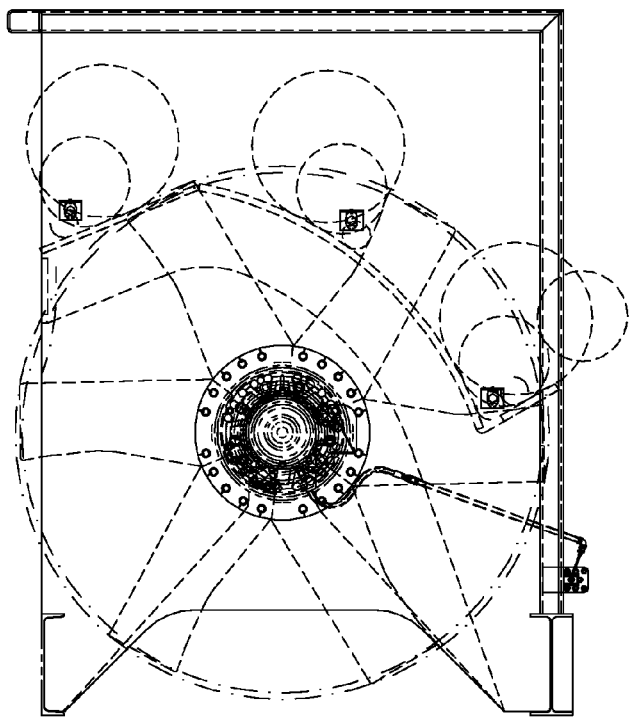
Figure 1C:
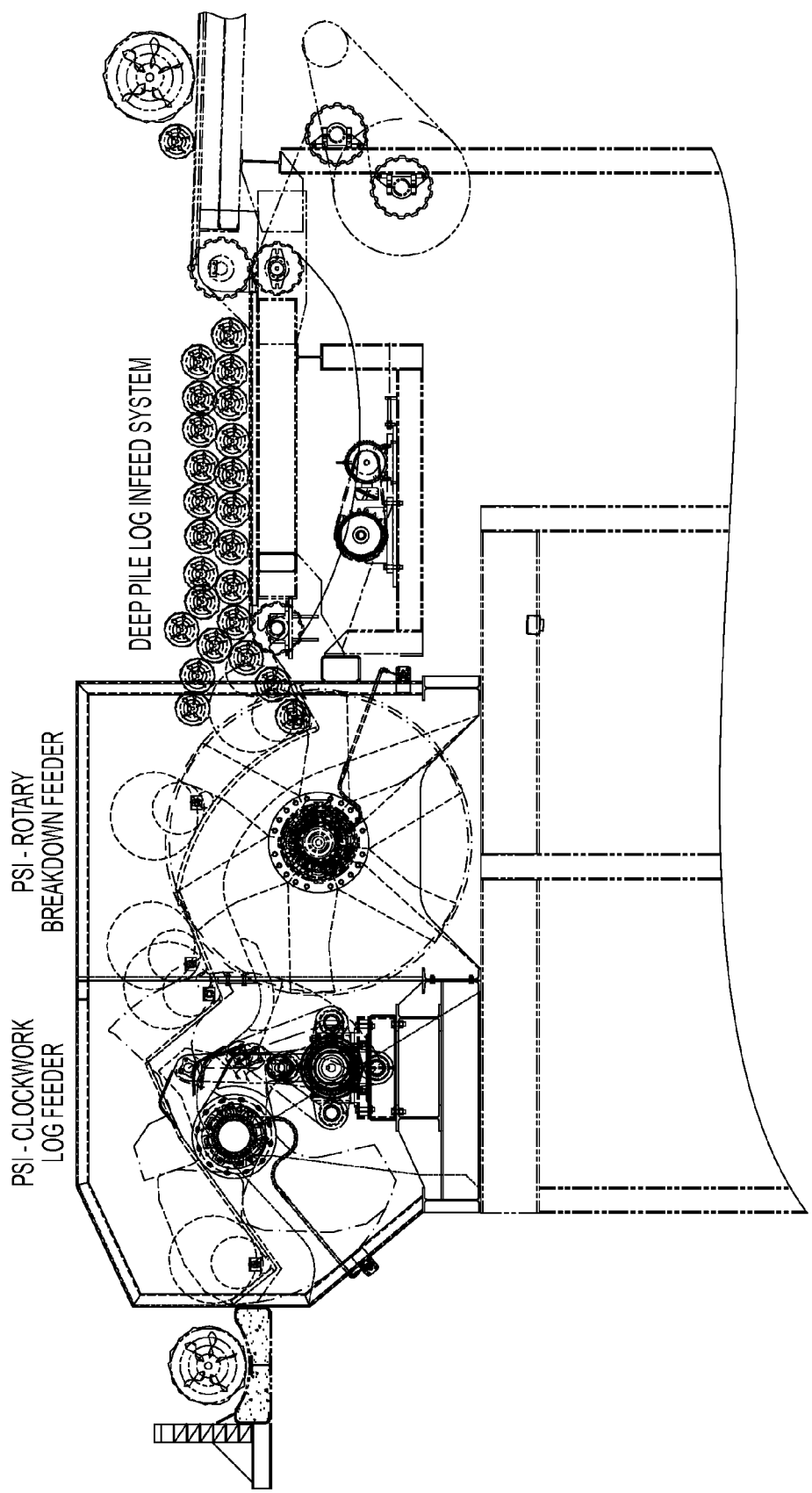
Figure 2:
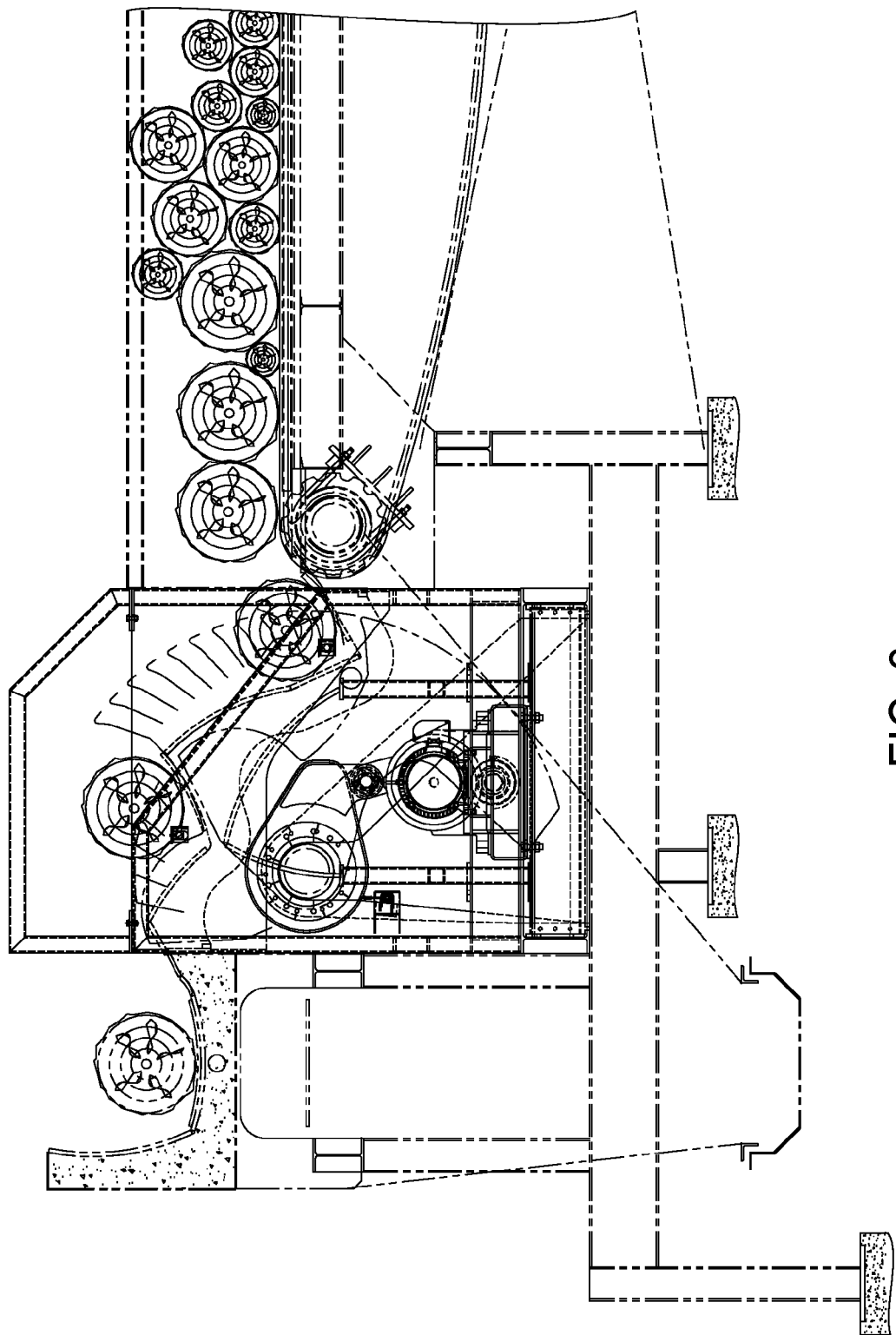
FIG. 2 illustrates a prior art clockwork singulator.
Figure 3:
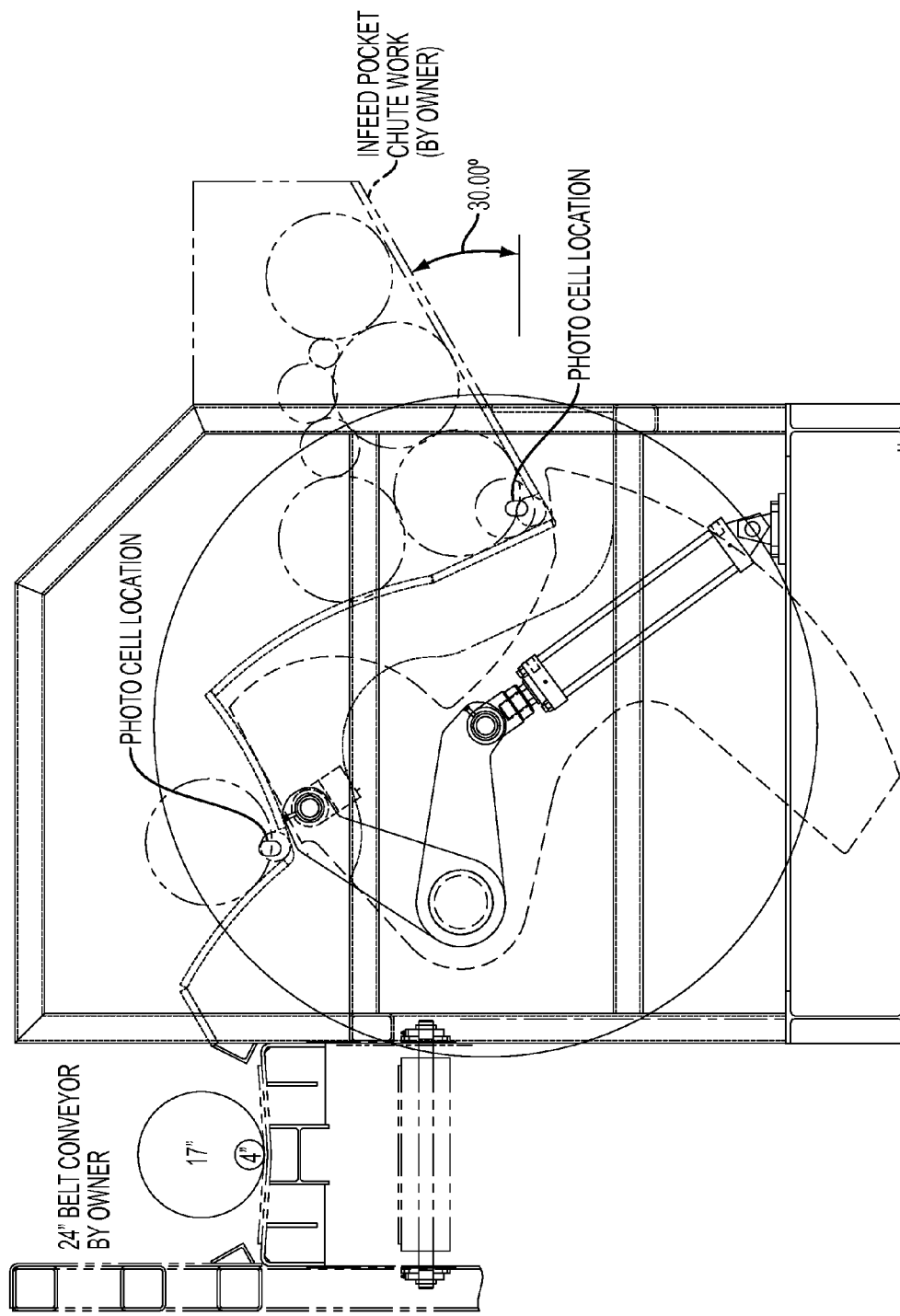
FIG. 3 illustrates a prior art clockwork singulator.
Figure 4:
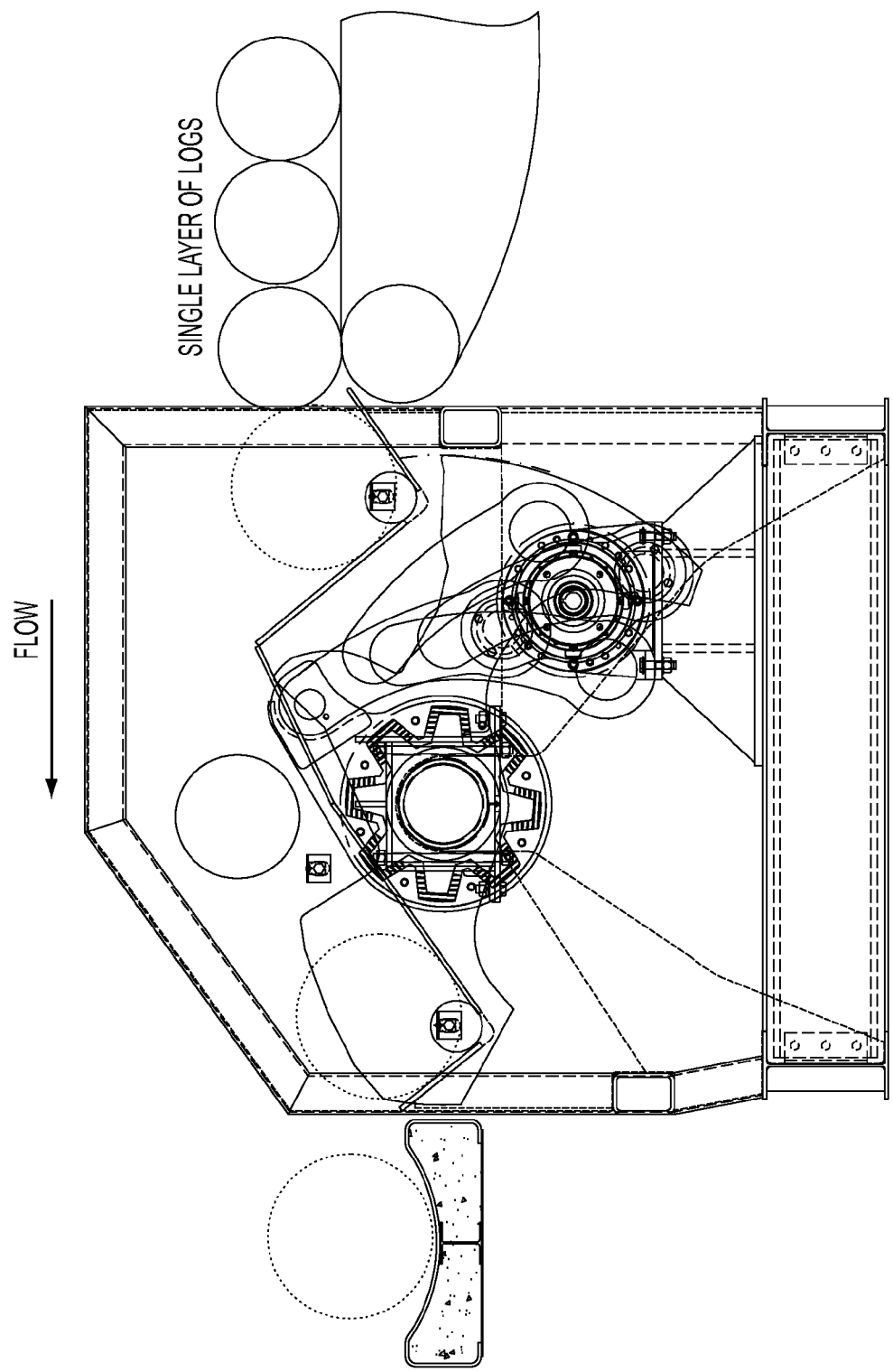
FIG. 4 illustrates a prior art clockwork singulator.
Figure 5:
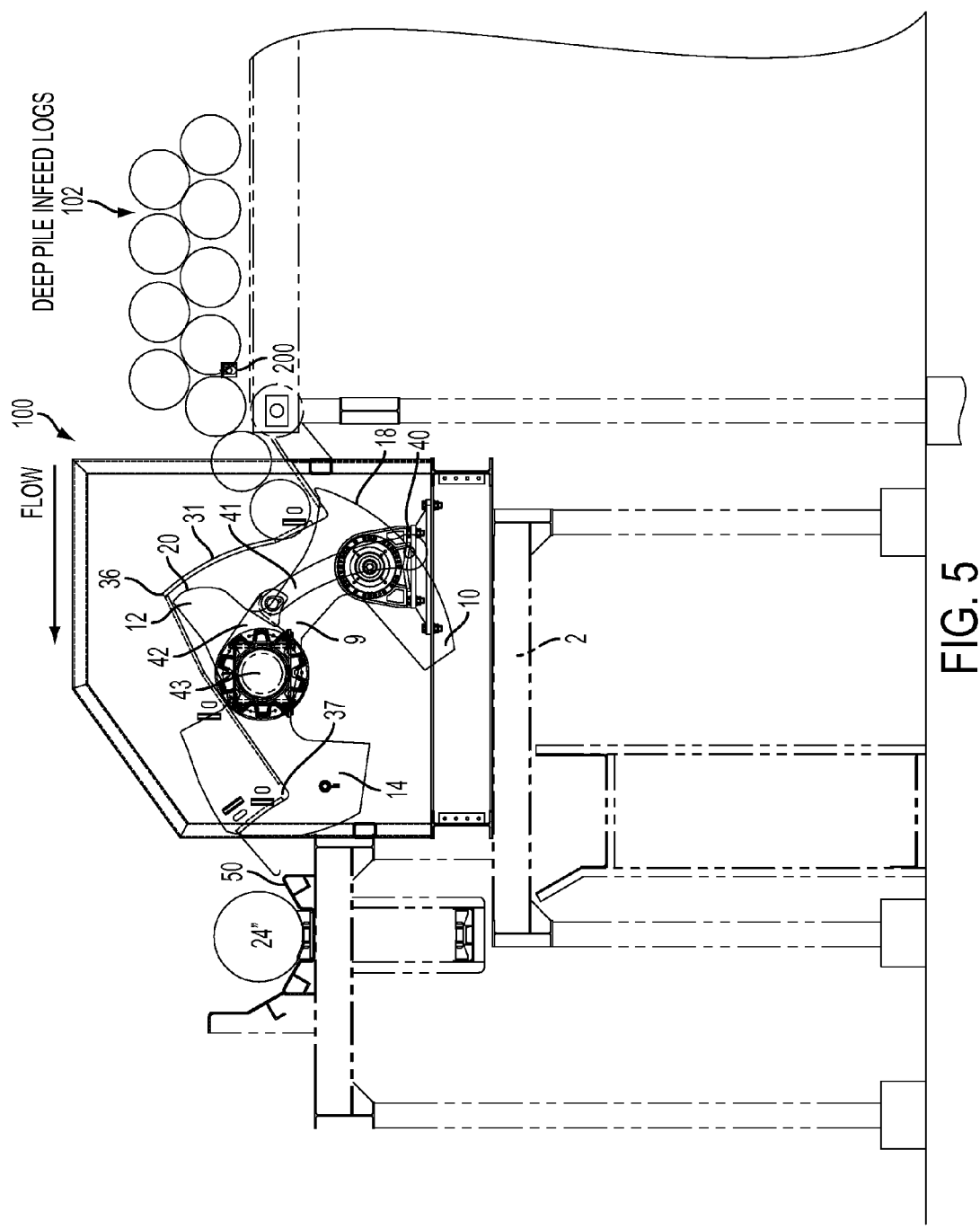
FIG. 5 illustrates a side view of a singulator according to the present invention.

The invention will now be explained with reference to the attached non-limiting FIGS. 5-16.

A log singulator 100 is shown in FIGS. 5-16. The log singulator 100 has a base 2 to support the singulator 100. Bases 2 for log singulators are now well known and any suitable base 2 can be used to support the singulator 100.

The log singulator 100 has a first barrier 31, a second barrier 32 and a third barrier 33, which are supported by the base 2. The first barrier 31 and the second barrier 32 form a peak 36. The peak 36 can be a corner as shown in the drawings, or any surface as desired, such as rounded. The third barrier 33 and the second barrier 32 form a valley 37. The first barrier 31 has a height, shown at 34, which is at least twice the thickness of logs being fed to the singulator. Non-limiting examples of suitable heights for the first barrier are from 30 to 50 inches, as shown at 72 in FIG. 10C. The first barrier 31 preferably has an angle A from 15 to 21 degrees, preferably 19 degrees, measured from a vertical plane, as shown at 71 in FIG. 10B. Preferably, the first, second and third barriers 31-33 have a length of at least the length of logs being fed to the singulator 100. Non-limiting examples of suitable lengths for the first, second and third barriers 31-33 are from 10 feet to 70 feet. If desired, the length of the barriers 31-33 can be formed by abutting a plurality of singulators 100 end-to-end, as described below, so that the length of the barriers 31-33 for each singulator 100 is combined.

The singulator 100 has a plurality of lifting devices 9. Each lifting device 9 comprises a first arm 10, a second arm 12 and a third arm 14 extending in a radial direction from a central axis. The lifting devices 9 are mounted on common central axis, usually with a common shaft 43. The lifting devices 9 are spaced apart along the length of the three barriers 31-33 and disposed within the barriers 31-33. The first barrier 31 and the second barrier 32 have openings constructed and arranged to allow the arms 10, 12, and 14 to extend there through. The lifting devices 9 are rotatable between a starting position shown in FIG. 13 and a finishing position shown in FIG. 14.

Figure 13:
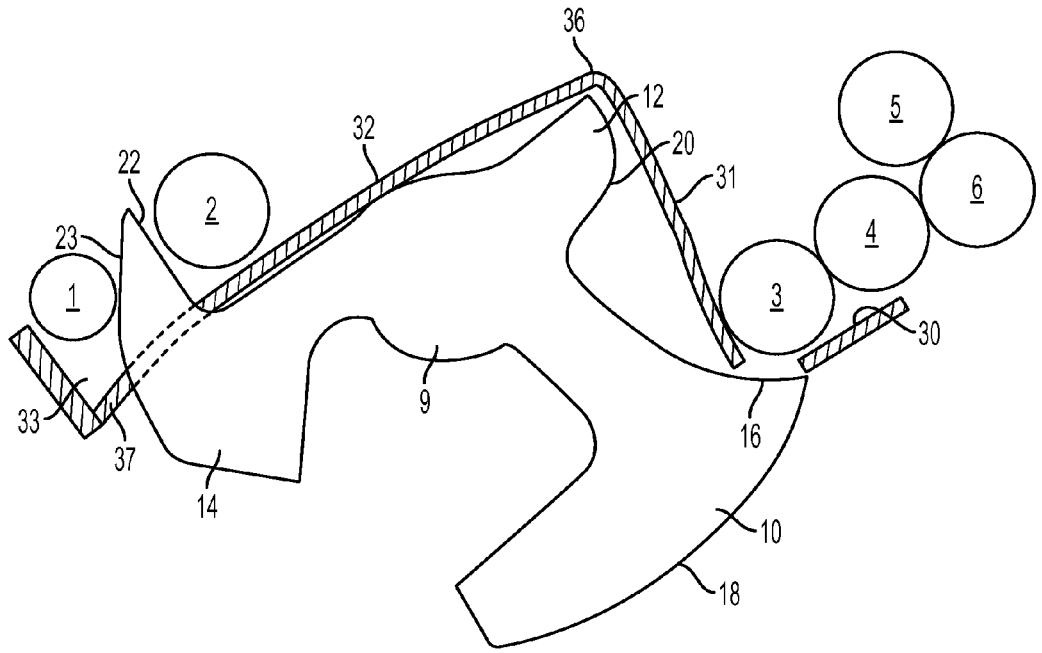
FIG. 13 illustrates a side view of a lifting device and barriers according to the present invention.

The first arm 10 is constructed and arranged so that in the starting position, shown in FIG. 13, the first arm 10 is retracted within the first barrier 31 and a log 3 can move from an in-feed deck 102 into a starting position against a bottom of the first barrier 31. When the lifting device 9 is rotated from the starting position to the finishing position, shown in FIG. 14, the first arm 10 extends from the first barrier 31 and the log 3 is lifted by a top surface 16 of the first arm 10 up the first barrier 31 and then over the peak 36 so the log 3 then travels down a first portion of the second barrier 32. A side surface 18 of the first arm 10 extends from the first barrier 31 in the finishing position to block other logs 4, 5, and 6 from contacting the first barrier 31. The first arm 10 is constructed to extend from the first barrier 31 a sufficient distance to lift the desired size log 30. A non-limiting example of how far the first arm 10 extends from the first barrier 31 during lifting is from 9 to 17 inches, which can be made larger for larger logs.

Figure 14:
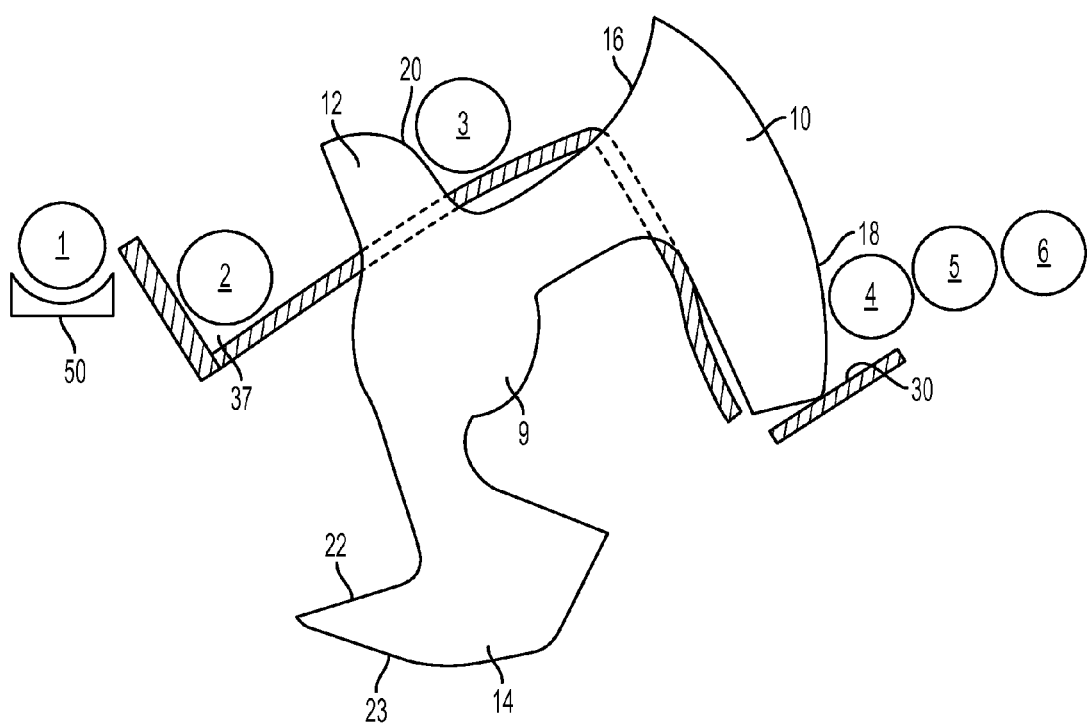
FIG. 14 illustrates a side view of a lifting device and barriers according to the present invention.

The second arm 12 is constructed and arranged such that in the finishing position, shown in FIG. 14, the second arm 12 extends from the second barrier 32 and the log 3 pushed over the peak 36 by the first arm 10 is held in a position of the first portion of the second barrier 32 by a top surface 20 of the second arm 12. In the starting position, shown in FIG. 13, the second arm 12 is retracted into the second barrier 32 allowing the log 2 to travel down a second portion of the second barrier 32.

The third arm 14 is constructed and arranged so that in the starting position, shown in FIG. 13, the third arm 14 extends from the second barrier 32 and the log 2 traveling from the first portion of the second barrier is held in the position of a second portion of the second barrier 32 by a top surface 22 of the third arm 14. When the lifting device rotates from the starting position to the finishing position, shown in FIG. 14, the third arm 14 retracts into the second barrier 32 and the log 2 held in the position of the second portion is allowed to drop into the valley 37. When the third arm 14 moves from the finishing position to the starting position, shown in FIG. 13, the log 1 in the valley 37 is moved by a back side 23 of the third arm 14 from the valley 37 up and over the third barrier 33 and onto a conveyor 50.

Preferably, the first, second and third arms 10, 12 and 14 are constructed and arranged such that the lifting device 9 is balanced through the rotation range utilized, more preferably dynamically balanced, with respect to the central axis to provide reduced vibration on the shaft 43 when rotated and also to significantly reduce the force required to rotate the shaft 43.

The lifting devices 9 can be rotated using any suitable drive system. An example of a preferred drive system includes a motor 40 connected to the shaft 43 by connecting arms 41 and 42, so that as the motor 40 rotates the arms 41 and 42 are constructed and arranged to rotate the shaft 43 and lifting devices 9 between the starting and finishing positions. In place of the electric motor 40, other drive systems can be utilized, such as gasoline or diesel motors, or pneumatic or hydraulic systems.

The amount rotation of the lifting device 9 during oscillation between the starting position and the finishing position should be such that a log present against the first barrier 31 is pushed over the peak 36. This amount will depend upon the length of the first arm 10 and the height of the first barrier 31. An example of a suitable amount of rotation between the starting position and the finishing position is from 50 to 71 degrees.

Figure 6:
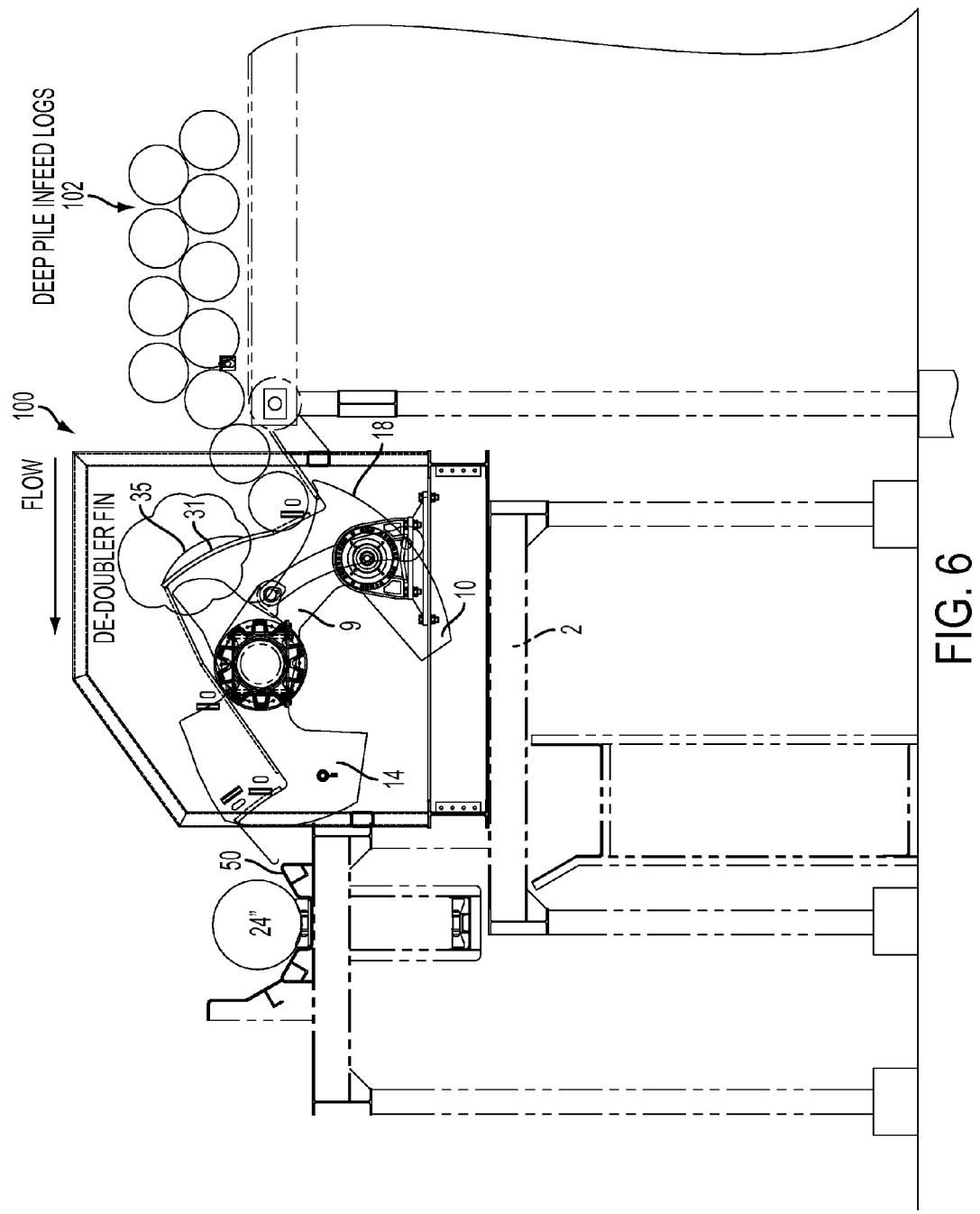
FIG. 6 illustrates a side view of a singulator according to the present invention.
Figure 7A:
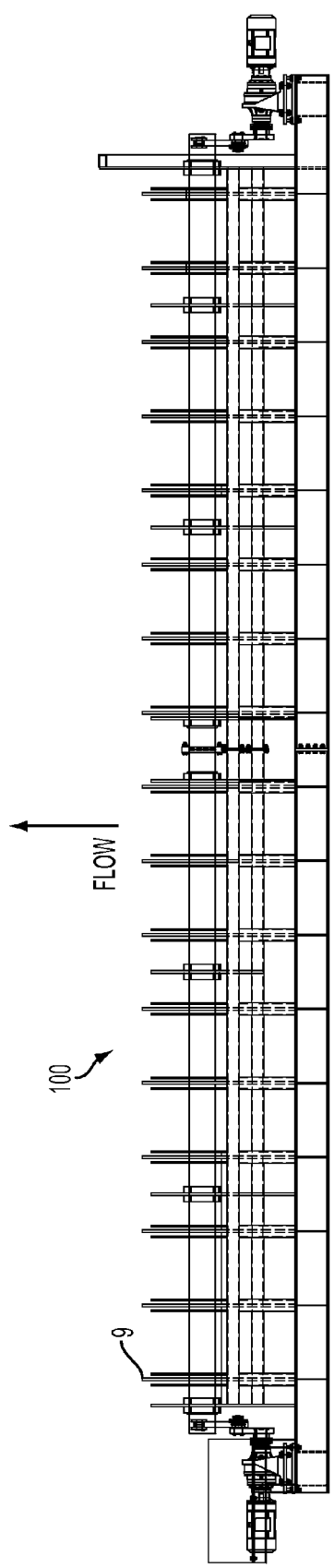
FIGS. 7A and 7B illustrate a top view of a singulator according to the present invention.
Figure 7B:
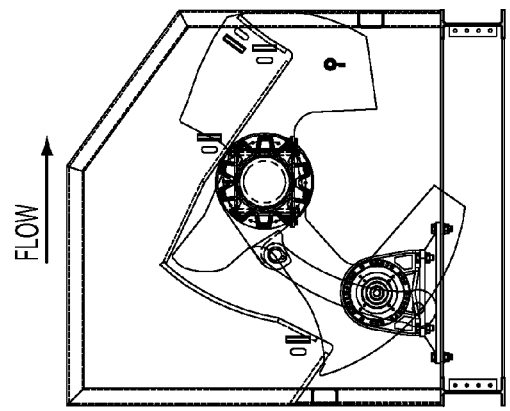
Figure 8:
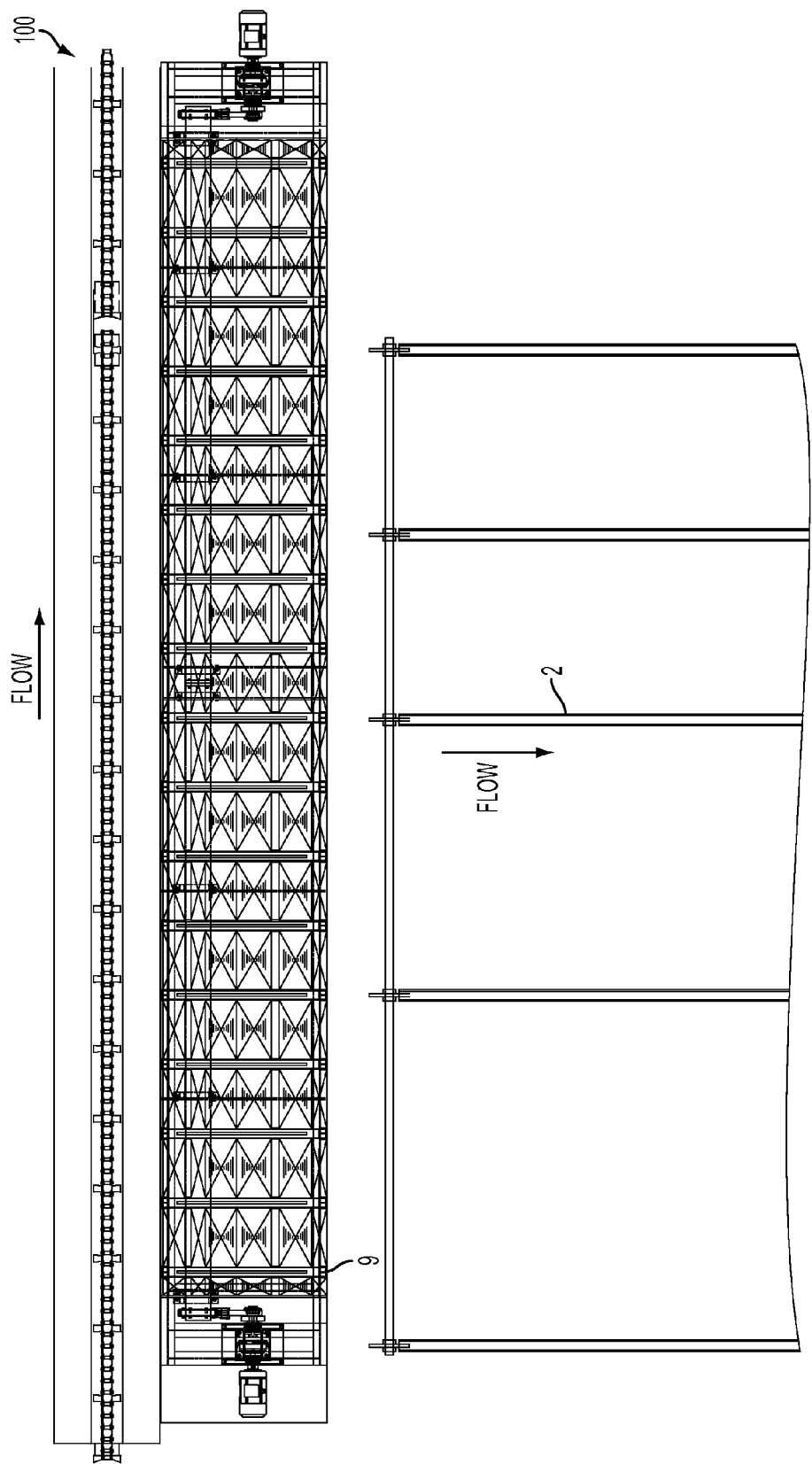
FIG. 8 illustrates a top view of a singulator according to the present invention.
Figure 16:
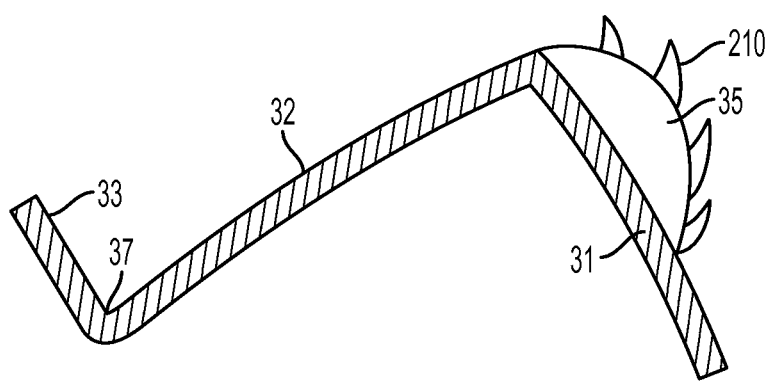
FIG. 16 illustrates a side view a preferred bulge.

The first barrier 31 can include a bulge 35, shown in FIG. 6, which is constructed to prevent more than a desired number of logs, preferably not more than one log, from being pushed over the peak 36 at the same time. Preferably, the top surface 16 of the first arm 10 is shaped, for example curved or angled, so that if more than one log is present on the top surface 16, the bulge 35 pushes any extra logs off of the top surface 16 if present, except for a desired number of logs, preferably one log, so that the extra logs pushed off of the top surface 16 return to the in-feed and only the desired number of logs is pushed over the peak 36 at a time. The bulge 35 can have traction barbs 210 constructed to spin the logs when lifted up against the bulge 35, as shown in FIG. 16.

Figure 9:
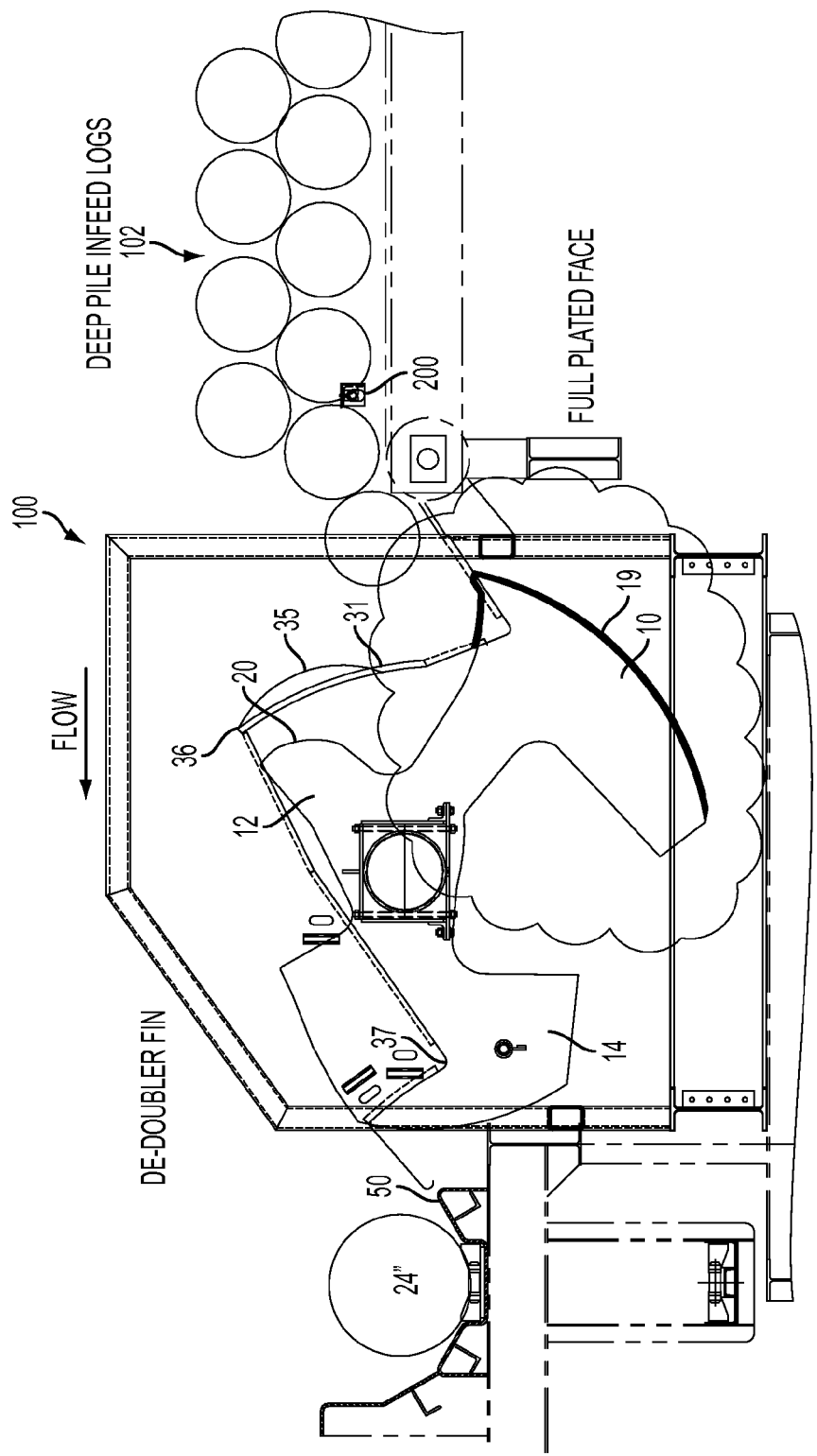
FIG. 9 illustrates a side view of a singulator according to the present invention.
Figure 10A:
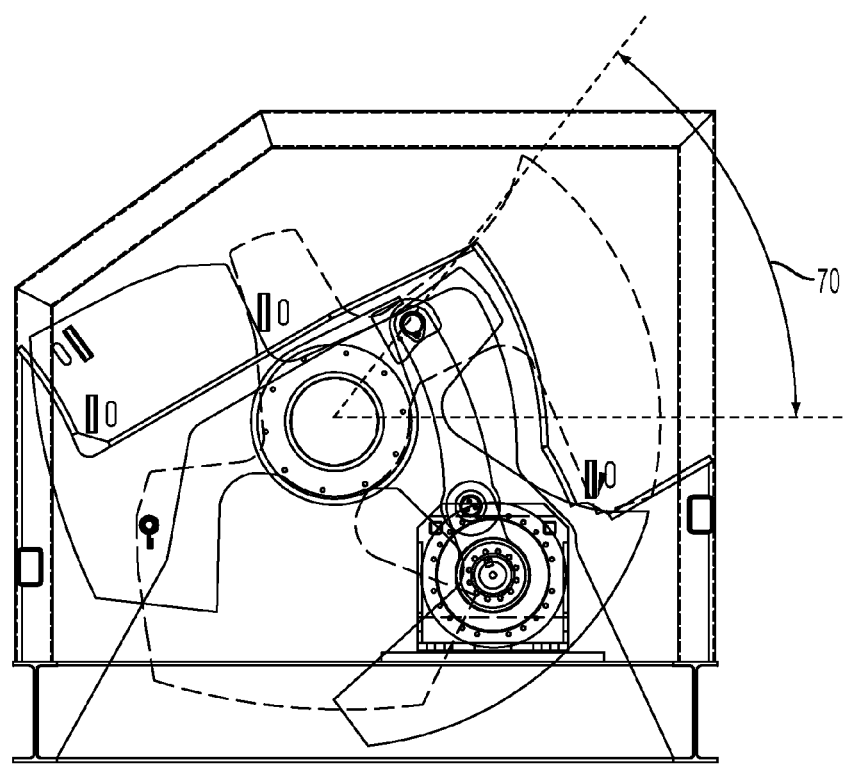
FIGS. 10A-10D illustrate a side view of a singulator according to the present invention.
Figure 10B:
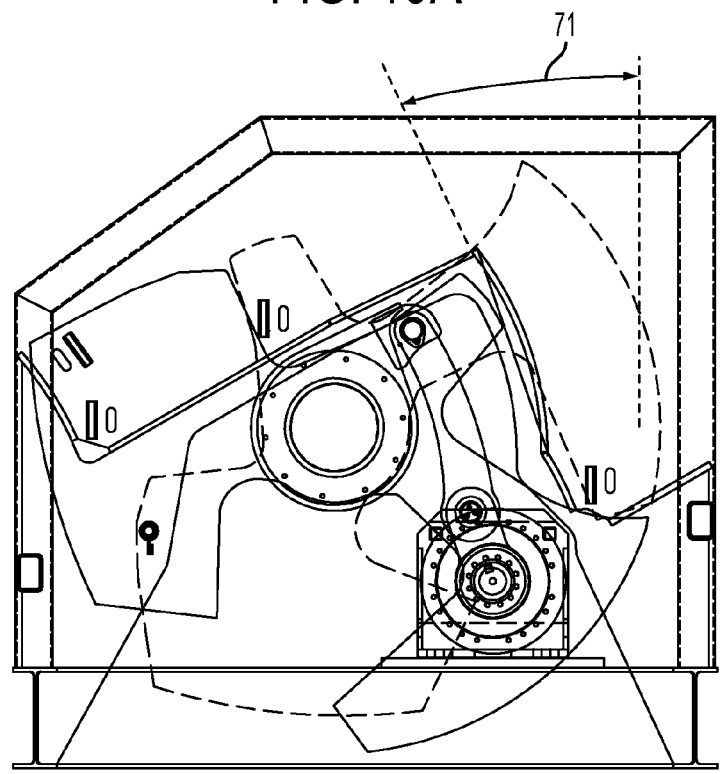
Figure 10C:
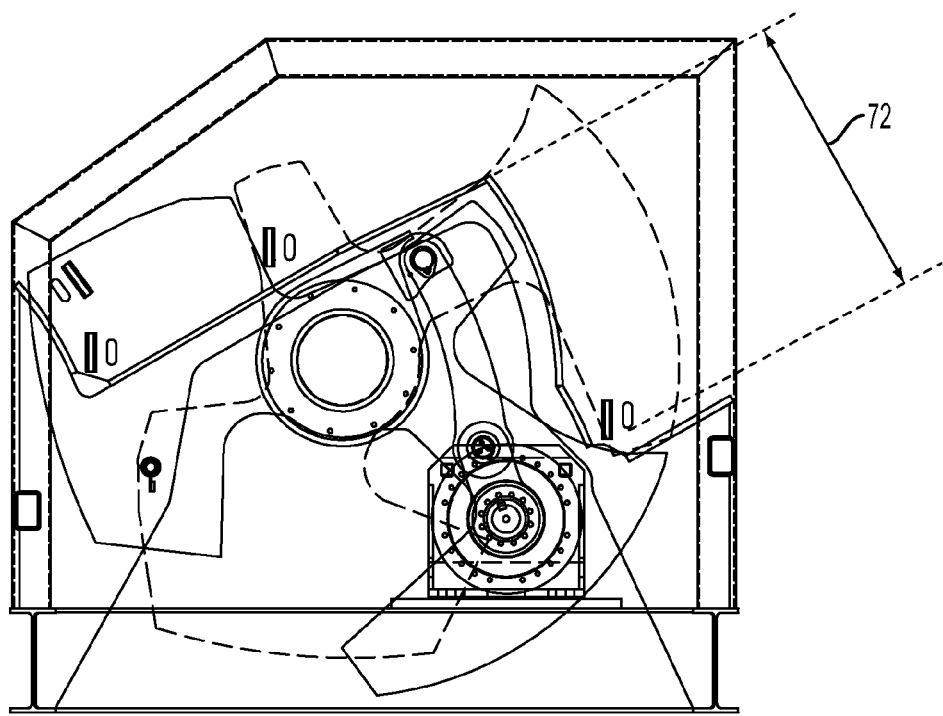
Figure 10D:
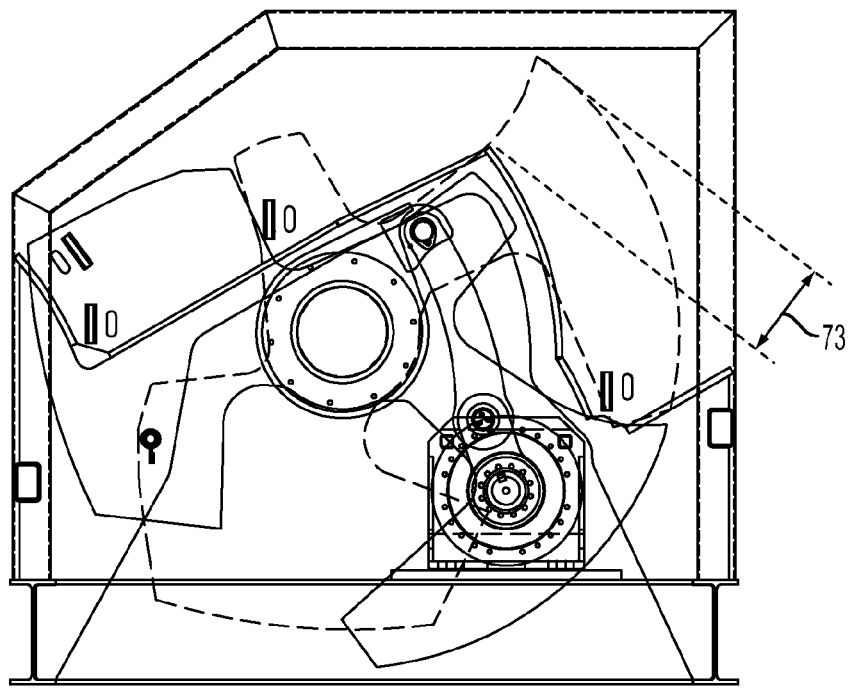
Figure 11:
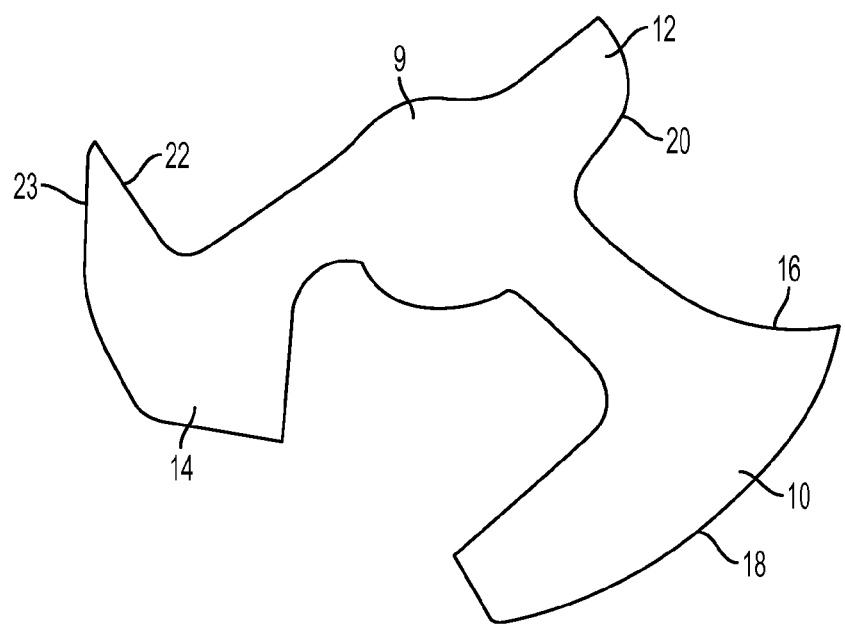
FIG. 11 is a side view of a lifting device according to the present invention.
Figure 12:
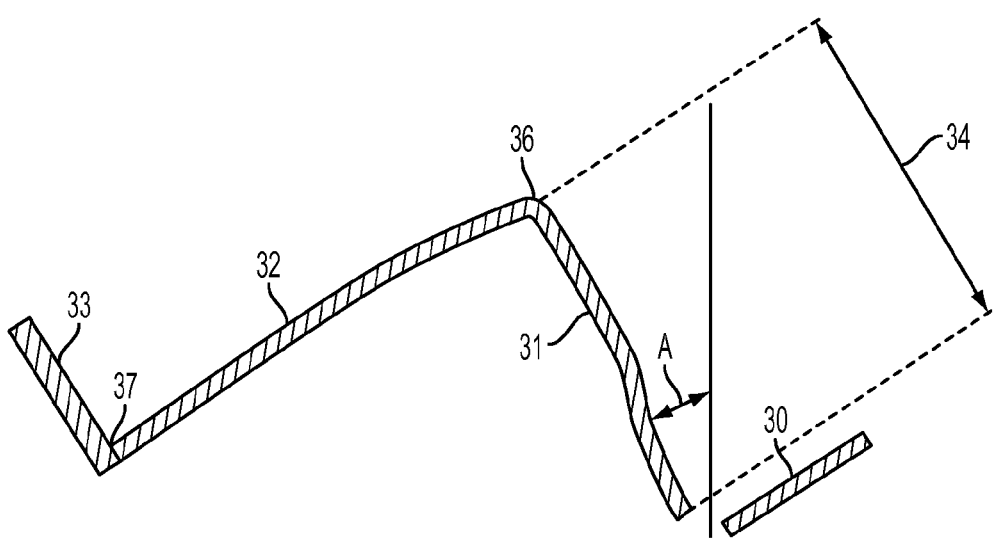
FIG. 12 is a side view of barriers according to the present invention.
Figure 15:
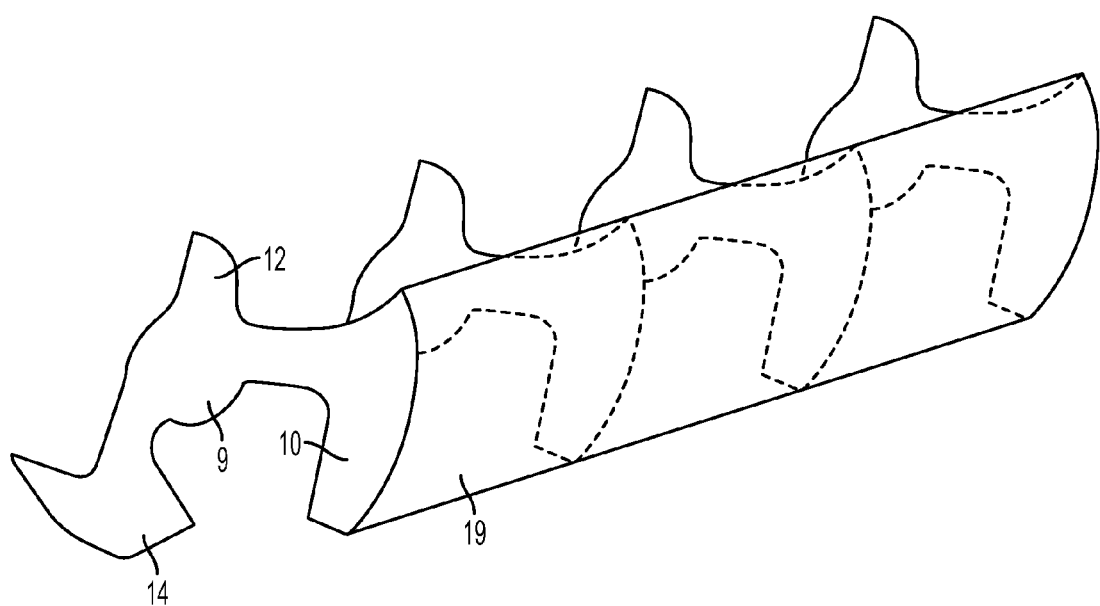
FIG. 15 illustrates a perspective view of a plurality of lifting devices according to the present invention.

The first barrier 31 can also include a shield 19 shown in FIGS. 9 and 15. The shield 19 is a barrier connecting the side surfaces 18 of the first arms 10. The shield 19 prevents debris from falling between the first arms 10.

The log singulator 100 can also include an optional fourth barrier 30 that forms a valley with the first barrier 31. The fourth barrier 30 may be part of the in-feed 102. If the fourth barrier 30 and the shield 19 are present, an opening between the first barrier 31 and the fourth barrier 30 should be provided so that the shield can retract into the opening.

While the lifting device 9 is shown in the Figs. as a separate structure from the central shaft, the term "lifting device" includes a structure in which the arms 10, 12, and 14 are individually connected to the central shaft 43, either directly or indirectly, or the arms 10, 12 and 14 are integrally formed with the shaft 43. The connections can be made by any desired means, such as welding, brazing, bolts, screws, or clamps.

The present invention also relates to a method of using the singulator 100 to supply single logs to a conveyor 50 from an in-feed 102 pile of logs. The method comprises supplying logs 1-6 to an in-feed 102 of the singulator 100 so that at least one first log 1 contacts the first barrier 31. The drive system 40 rotates the lifting devices 9 from a starting position to a finishing position during which the first log 1 is lifted by the top surface 16 of the first arm 10 over the peak 36 to contact a top surface 20 of the second arm 12 and the second barrier 32. Additional logs 2-6 are held away from the first barrier 31 by the side surface 18.

The drive system 40 rotates the lifting devices 9 back to the starting position during which the second arm 12 retracts back into the second barrier 32 and the first log 1 falls down the second barrier 32 to contact a top surface 22 of the third arm 14 and the first arm 10 retracts back into the first barrier 31 so that at least one second log 2 can contact the first barrier 31.

The drive system rotates the lifting devices 9 back to the finishing position during which the second log 2 is lifted by the top surface 16 of the first arm 10 over the peak 36 to contact a top surface 20 of the second arm 12 and the second barrier 32. The third arm 14 retracts back into the second barrier 32 and the first log 1 falls into the valley 37.

The drive system rotates the lifting devices 9 back to the starting position during which the first log 1 in the valley 37 is lifted by the back side 23 of the third arm 14 up over the third barrier 33 and onto the conveyor 50. The second arm 12 retracts into the second barrier 32 to allow the second log 2 to drop onto the top surface 22 of the third arm 14. At least one third log 3 contacts the first barrier 31.

If the bulge 35 is present on the first barrier 31, the bulge 35 is constructed and arranged to knock extra logs off of the first arm 10 if present, except for the desired number of logs, when the drive system rotates the lifting devices 9 from the starting position to the finishing position to ensure that only a desired number or logs is pushed over the peak 36.

If a shield 19 is present, the shield prevent debris from being trapped between the lifting devices 9 when the drive system rotates the lifting devices 9 from the starting position to the finishing position and from the finishing position to the starting position.

The method is repeated in this manner to provide an endless supply of single logs to the conveyor 50.

The singulator is capable of handling a deep pile of logs on the in-feed without having to feed the logs in a single layer. Furthermore, no pre-breakdown machine is necessary.

If desired, more than one shorter singulator 100 as described herein can be butted end-to-end to make a longer singulator, so that when shorter logs are fed to the longer singulator, the singulator(s) 100 not required can remain shut down to save electricity and wear and only the singulator(s) 100 required to handle the length of the log need be activated. For example, two singulators 100, each of 30 feet in length, can be abutted to one another to make a 60 foot longer singulator having combined barriers 31-33 of 60 feet in length. When a log of 30 feet in length or less is fed to the longer singulator, only one of the 30 foot singulators 100 needs to be activated. The in-feed can have a sensing device 200 to determine how many singulators 100 need to be activated to handle the length of the logs being in-fed. An example of the sensing device 200 is a photo receptor.

While the claimed invention has been described in detail and with reference to specific embodiments thereof, it will be apparent to one of ordinary skill in the art that various changes and modifications can be made to the claimed invention without departing from the spirit and scope thereof.

The invention claimed is:

1. A log singulator comprising:
   a base;
   first, second and third barriers supported by the base, the first barrier and the second barrier form a peak, the third barrier and the second barrier form a valley, the first barrier having a height at least twice the thickness of logs being fed to the singulator from an in-feed, the first, second and third barriers having a length of at least the length of logs being fed to the singulator during use;
   a plurality of lifting devices having first, second and third arms extending in a radial direction from a central axis, the lifting devices being mounted on a shaft, the lifting devices being spaced apart along the length of the three barriers and disposed within the barriers, the first and second barriers having openings constructed and arranged to allow the arms to extend therethrough, and the lifting devices being rotatable between a starting position and a finishing position;
   the first arm being constructed and arranged so that in the starting position the first arm is retracted within the first barrier and a log can move into a starting position against a bottom of the first barrier, and when the lifting device is rotated from the starting position to the finishing position the first arm extends from the first barrier and the log is lifted by a top surface of the first arm up the first barrier and then over the peak so the log then travels down a first portion of the second barrier, and a side surface of the first arm extending from the first barrier blocks other logs from contacting the first barrier;
   the second arm being constructed and arranged such that in the finishing position the second arm extends from the second barrier and the log pushed over the peak by the first arm is held in a position of the first portion of the second barrier by a top surface of the second arm and in the starting position the second arm is retracted into the second barrier allowing the log to travel down a second portion of the second barrier;
   the third arm being constructed and arranged so that in the starting position the third arm extends from the second barrier and the log traveling from the first portion of the second barrier is held in the position of a second portion of the second barrier by a top surface of the third arm and when the lifting device rotates from the starting position to the finishing position the third arm retracts into the second barrier and the log held in the position of the second portion is allowed to drop into the valley, and when the third arm moves from the finishing position to the starting position the log in the valley is moved by a back side of the third arm from the valley up and over the third barrier; and
   a drive system connected to the shaft constructed and arranged to rotate the shaft and lifting devices between the starting and finishing positions.

2. The singulator according to claim 1, further comprising a shield connecting a plurality of the side surfaces of the first arms.

3. The singulator according to claim 1, wherein the length of the first, second and third barriers is from 10 to 70 feet.

4. The singulator according to claim 1, wherein the lifting devices are balanced with respect to the central axis.

5. The singulator according to claim 1, wherein the first barrier has a bulge constructed to prevent more than a desired number of logs from being lifted over the peak by the first arm.

6. The singulator according to claim 5, wherein the bulge has traction barbs.

7. The singulator according to claim 1, wherein the first barrier has an angle A from 15 to 21 degrees measured from a vertical plane.

8. The singulator according to claim 1, further comprising a plurality of singulators abutted end-to-end and the length of the barriers comprising the total combined length of the barriers of the singulators.

9. A method of using a singulator to supply single logs to a conveyor from an in-feed pile of logs, the singulator comprising:
   a base;
   first, second and third barriers supported by the base, the first barrier and the second barrier form a peak, the third barrier and the second barrier form a valley, the first barrier having a height at least twice the thickness of logs being fed to the singulator from an in-feed, the first, second and third barriers having a length of at least the length of logs being fed to the singulator; and
   a plurality of lifting devices having first, second and third arms extending in a radial direction from a central axis, the lifting devices being mounted on a shaft, the lifting devices being spaced apart along the length of the three barriers and disposed within the barriers, the first and second barriers having openings constructed and arranged to allow the arms to extend therethrough, and the lifting devices being rotatable between a starting position and a finishing position, the method comprising:

supplying logs to an in-feed of the singulator so that at least one first log contacts the first barrier;

using the drive system to rotate the lifting devices from a starting position to a finishing position during which the first log is lifted by the top surface of the first arm over the peak to contact a top surface of the second arm and the second barrier, and additional logs are held away from the first barrier by the side surface;

using the drive system to rotate the lifting devices back to the starting position during which the second arm retracts back into the second barrier and the first log falls down the second barrier to contact a top surface of the third arm and the first arm retracts back into the first barrier so that at least one second log can contact the first barrier;

using the drive system to rotate the lifting devices back to the finishing position during which the second log is lifted by the top surface of the first arm over the peak to contact a top surface of the second arm and the second barrier, and the third arm retracts back into the second barrier and the first log falls into the valley; and using the drive system to rotate the lifting devices back to the starting position during which the first log in the valley is lifted by a back side of the third arm up over the third barrier and onto the conveyor, the second arm retracts into the second barrier to allow the second log to drop onto the top surface of the third arm, and the first arm retracts into the first barrier so that at least one third log contacts the first barrier.

10. The method according to claim 9, wherein the first barrier has a bulge and the method further comprises using the bulge to knock extra logs off of the first arm except for a desired number of logs when the first arm is lifting more than one log up the first barrier.

11. The method according to claim 9, wherein the drive system comprises an electric motor connected to the shaft by at least one connecting arm.

12. The method according to claim 9, wherein the first barrier has an angle A from 15 to 21 degrees measured from a vertical plane.

13. The method according to claim 9, further comprising a shield connecting a plurality of the side surfaces of the first arms, wherein the method comprising using the shield to prevent debris from being trapped between the lifting devices.

14. The method according to claim 9, wherein the length of the first, second and third barriers is from 10 to 70 feet.

15. The method according to claim 9, wherein the lifting devices are dynamically balanced with respect to the central axis.

16. The method according to claim 9, wherein a plurality of singulators are abutted end-to-end and further comprising a sensor constructed to sense the a length of the logs, the method further comprising determining a length of the logs being in-fed to the singulator, and activating only the number of singulators required to handle the length of the logs.

* * * * *